US012424652B2

(12) United States Patent
Kim

(10) Patent No.: US 12,424,652 B2
(45) Date of Patent: Sep. 23, 2025

(54) WINDING APPARATUS FOR CYLINDRICAL BATTERY

(71) Applicant: ENERGY TECH SOLUTION CO., LTD., Seoul (KR)

(72) Inventor: Young Hwan Kim, Incheon (KR)

(73) Assignees: ENERGY TECH SOLUTION CO., LTD., Seoul (KR); Young Hwan Kim, Incheon (KR)

( * ) Notice: Subject to any disclaimer, the term of this patent is extended or adjusted under 35 U.S.C. 154(b) by 0 days.

(21) Appl. No.: 18/870,820

(22) PCT Filed: Aug. 31, 2022

(86) PCT No.: PCT/KR2022/012997
§ 371 (c)(1),
(2) Date: Dec. 2, 2024

(87) PCT Pub. No.: WO2023/234480
PCT Pub. Date: Dec. 7, 2023

(65) Prior Publication Data
US 2025/0174700 A1    May 29, 2025

(30) Foreign Application Priority Data

Jun. 2, 2022   (KR) .................... 10-2022-0067295

(51) Int. Cl.
*H01M 10/00*   (2006.01)
*H01M 10/04*   (2006.01)

(52) U.S. Cl.
CPC .............................. *H01M 10/0409* (2013.01)

(58) Field of Classification Search
CPC .. H01M 10/0409; H01M 10/00; H01M 10/04; H01M 10/0404; H01M 10/0422; H01M 10/0431
See application file for complete search history.

(56) References Cited

U.S. PATENT DOCUMENTS

2013/0252054 A1* 9/2013 Barone .............. H01M 50/534
429/94

FOREIGN PATENT DOCUMENTS

| KR | 10-2002-0053841 A | 7/2002 | |
|---|---|---|---|
| KR | 10-1429132 B1 | 8/2014 | |
| KR | 10-2016-0097915 A | 8/2016 | |
| KR | 20210157213 A * | 12/2021 | ........ H01M 10/0436 |

OTHER PUBLICATIONS

Hong et al., Manufacturing Method Of Unit Cell, Dec. 2021, See the Abstract. (Year: 2021).*

* cited by examiner

*Primary Examiner* — Tiffany Legette
*Assistant Examiner* — Monique M Wills
(74) *Attorney, Agent, or Firm* — Rabin & Berdo, P.C.

(57) ABSTRACT

A cylindrical battery winding apparatus comprises a pair of separator unwinding parts that unwind separators from separator rolls to separate a positive electrode material and a negative electrode material; a pair of alignment parts including grippers that pull and align one end of the positive electrode material and the negative electrode material respectively cut to a predetermined length; a winding part that stacks the positive electrode material/separator/negative electrode material and winds the stacked materials to form a jelly roll; and a cutting part that cuts the separator and cuts a fixing tape to secure the jelly roll.

8 Claims, 6 Drawing Sheets

WINDING APPARATUS FOR CYLINDRICAL BATTERY

TECHNICAL FIELD

This invention relates to a winding apparatus for cylindrical batteries, and more specifically, to a winding apparatus that can manufacture high-quality cylindrical batteries by maintaining a constant tension required for alignment within the allowable tolerance.

BACKGROUND ART

Cylindrical batteries are composed of jelly rolls. The jelly roll is an intermediate form of the battery fabricated through a winding process, where a separator is inserted between positive and negative electrodes, and then rolled up, or through a stacking process, where positive and negative electrodes are cut and stacked alternately. The jelly roll is then inserted into a cylindrical or rectangular aluminum can, and in the case of pouch-type batteries, it is wrapped in a pouch, sealed or welded to prevent electrolytes from leaking out, and then the electrolyte is injected to complete the assembly process. After injecting the electrolyte into the cylindrical can containing the jelly roll and allowing it to stabilize, it becomes a cylindrical battery.

Defects in secondary ion batteries can lead to fires, necessitating strict quality control. The causes of defects in secondary ion batteries can include misalignment of the positive and negative electrodes, and repeated charging and discharging can cause material deformation, leading to issues such as swelling.

Additionally, traditional winding apparatus require operators to manually position and guide the electrode materials, resulting in low productivity and frequent defects.

DETAILED DESCRIPTION OF THE INVENTION

Technical Challenge

To solve the above-mentioned problems, the present invention provides a semi-automatic cylindrical battery winding apparatus that can align within allowable tolerances while maintaining constant tension using grippers and servo motors.

Technical Solution

A cylindrical battery winding apparatus according to the present invention comprises a pair of separator unwinding parts that unwind separators from separator rolls to separate a positive electrode material and a negative electrode material; a pair of alignment parts including grippers that pull and align one end of the positive electrode material and the negative electrode material respectively cut to a predetermined length; a winding part that stacks the positive electrode material/separator/negative electrode material and winds the stacked materials to form a jelly roll; and a cutting part that cuts the separator and cuts a fixing tape to secure the jelly roll.

The pair of separator unwinding parts is configured as a pair of upper and lower parts and a pair of tension rolls is used to adjust tension of the separator unwound from the separator rolls.

The gripper is wire-connected to a wire shaft that rotates by a servo motor.

When the positive electrode material and a negative electrode material are wound on a mandrel, the gripper is dragged by a rotational force of the mandrel and the wire of the servo motor is pulled to generate tension, and when winding is completed, the wire is wound around the wire shaft by rotation of the servo motor and returned to its original position.

The gripper is guided by an LM guide and released by a grip releaser.

The winding part includes the mandrel, which is a core rod, the servo motor providing rotational force to the mandrel, and a cylinder for contacting and separating the mandrel.

The cutting part includes a clamp roll, a clamp holder holding the clamp roll, a separator cutter for cutting the separator, a tape cutter for cutting the fixing tape, and a plurality of cylinders for vertically operating the clamp holder, the separator cutter, and the tape cutter.

Advantageous Effects

The cylindrical battery winding apparatus according to the present invention uses grippers controlled by servo motors to maintain constant tension while keeping alignment within allowable tolerances, resulting in fewer defects.

Additionally, the semi-automatic loading and seating guide operations for the electrode materials significantly enhance productivity.

MODE FOR INVENTION

Figure 1:
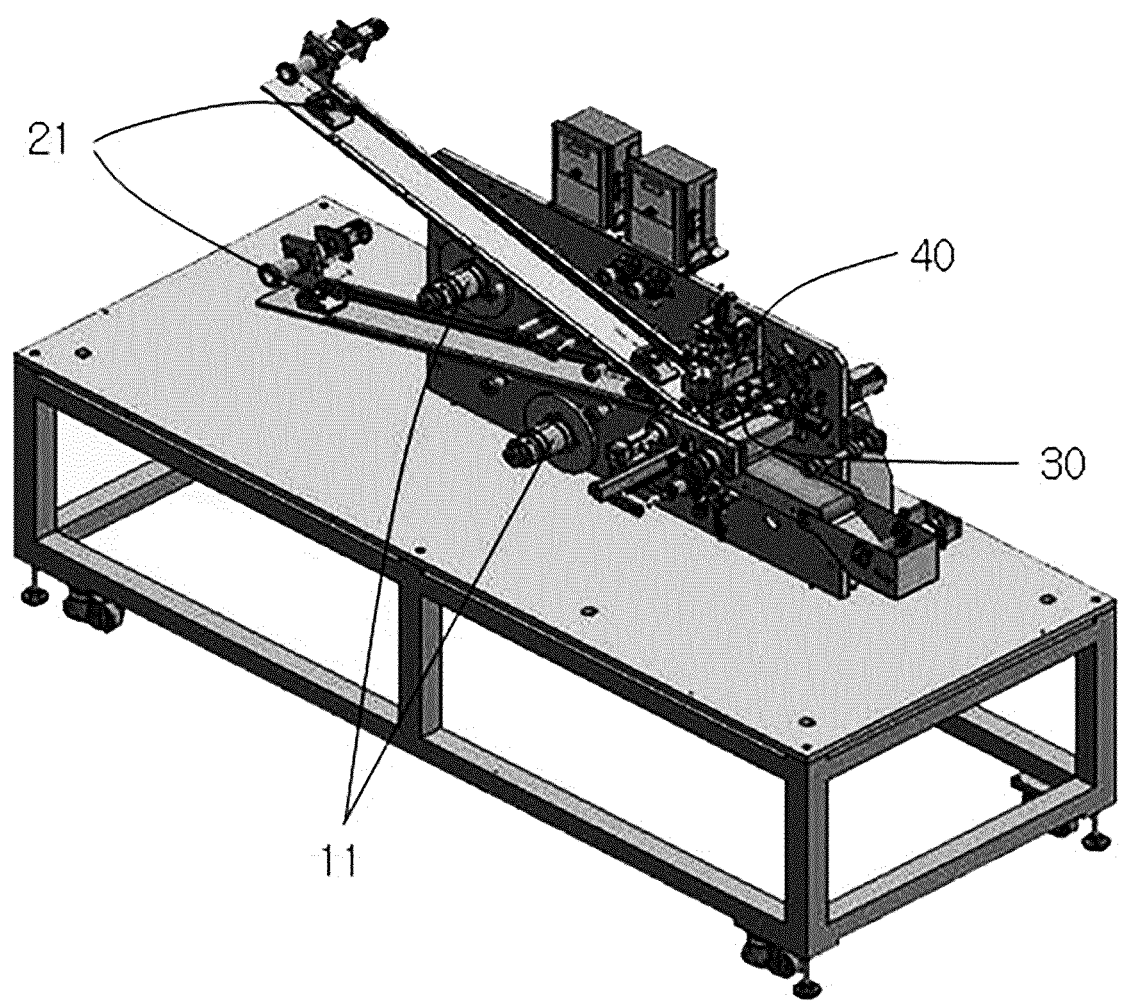
FIG. 1 is a perspective view of a cylindrical battery winding apparatus according to the present invention.

FIG. 1 is a perspective view of a cylindrical battery winding apparatus according to the present invention, which comprises a pair of separator unwinding parts 10 that unwind separators from separator rolls 11 to separate a positive electrode material and a negative electrode material; a pair of alignment parts 20 including grippers 21 that pull and align one end of the positive electrode material and the negative electrode material respectively cut to a predetermined length; a winding part 30 that stacks the positive electrode material/separator/negative electrode material and winds the stacked materials to form a jelly roll; and a cutting part 40 that cuts the separator and cuts a fixing tape to secure the jelly roll.

Figure 2:
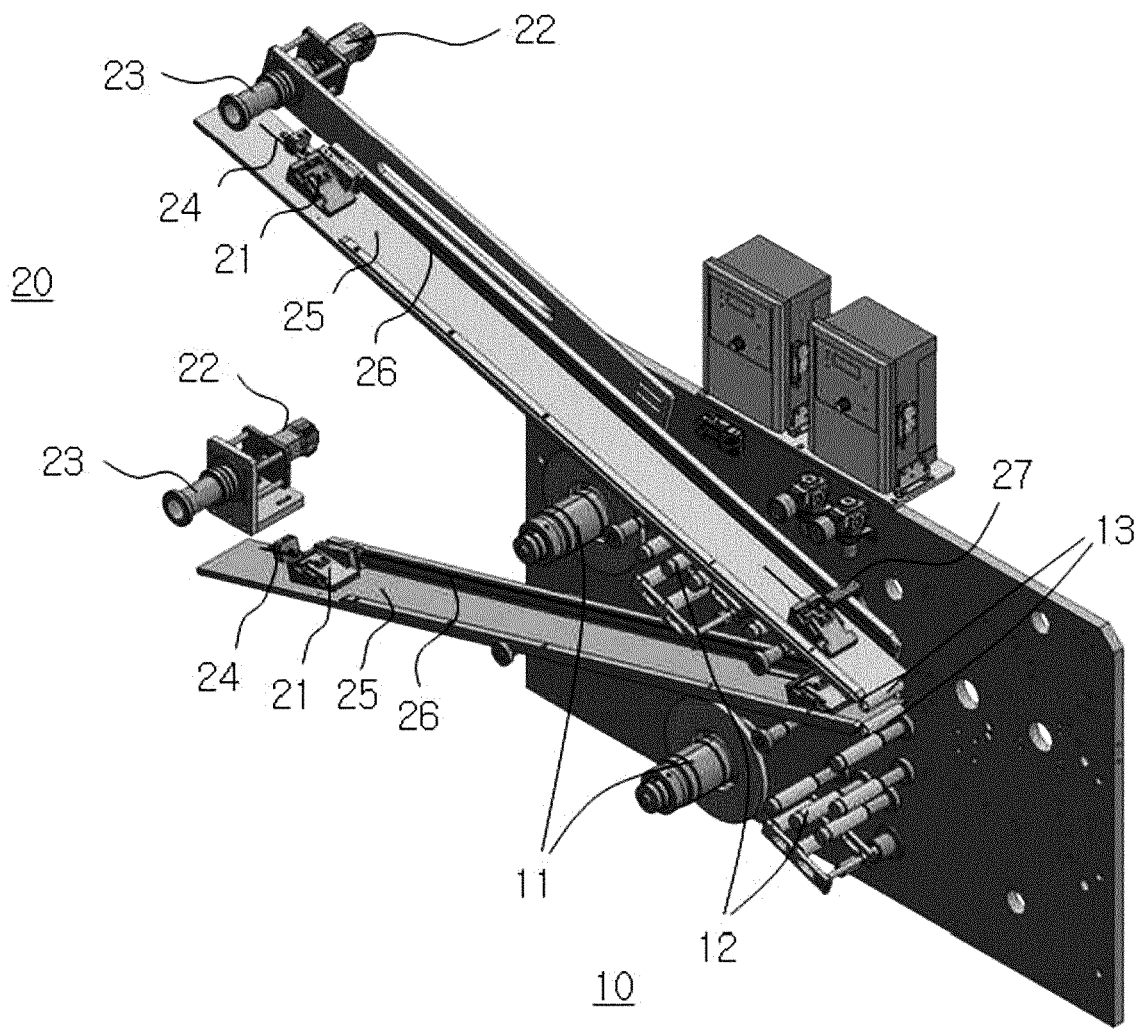
FIG. 2 is a perspective view of a separator unwinding parts and an alignment parts of the cylindrical battery winding apparatus according to the present invention.

FIG. 2 is a perspective view of the pair of separator unwinding parts 10 and the pair of alignment parts 20 of the cylindrical battery winding apparatus according to the present invention. The separator is a membrane that prevents short-circuiting by separating the positive electrode material and the negative electrode material while allowing lithium ions to pass through.

The pair of separator unwinding parts 10 is configured as a pair of upper and lower parts and a pair of tension rolls 12 is used to adjust tension of the separator unwound from the separator rolls 11 while the positive and negative electrode materials are stacked and wound at idle rolls 13, respectively.

The pair of alignment parts 20 is configured as a pair of upper and lower parts to supply the positive electrode material and the negative electrode material, respectively. To prevent misalignment that could lead to defects, the grippers are used to maintain tension while ensuring that the positive electrode material and the negative electrode material are wound on a mandrel 31 in a cylindrical manner.

The positive electrode material and the negative electrode material are called electrode materials.

In a conventional winding apparatus, the electrode materials cut to a predetermined length are placed on a seat plate 25, and one end is inserted into the mandrel via the idle roll 13 and rotated for winding. At this time, the other end of the electrode materials remains free, which can cause it to flutter or misalign, resulting in defects in the jelly roll.

In order to solve the above problems, the present invention ensures that one end of the electrode materials is held by a gripper while the other end is wound on the mandrel, creating tension.

The gripper 21 that travels along the seat plate 25 is connected via a wire 24 to a wire shaft 23 that rotates under the control of a servo motor 22. When the electrode materials are being wound, it is pulled by the rotational force of the mandrel, causing the servo motor to consistently pull the wire, generating tension. Once the winding is complete, the gripper returns to its original position as the wire is wound back onto the wire shaft through the reverse rotation of the servo motor.

The present invention utilizes an LM guide 26 to ensure that the gripper moves smoothly and without shaking. The gripper is mounted on an LM guide block.

Figure 3:
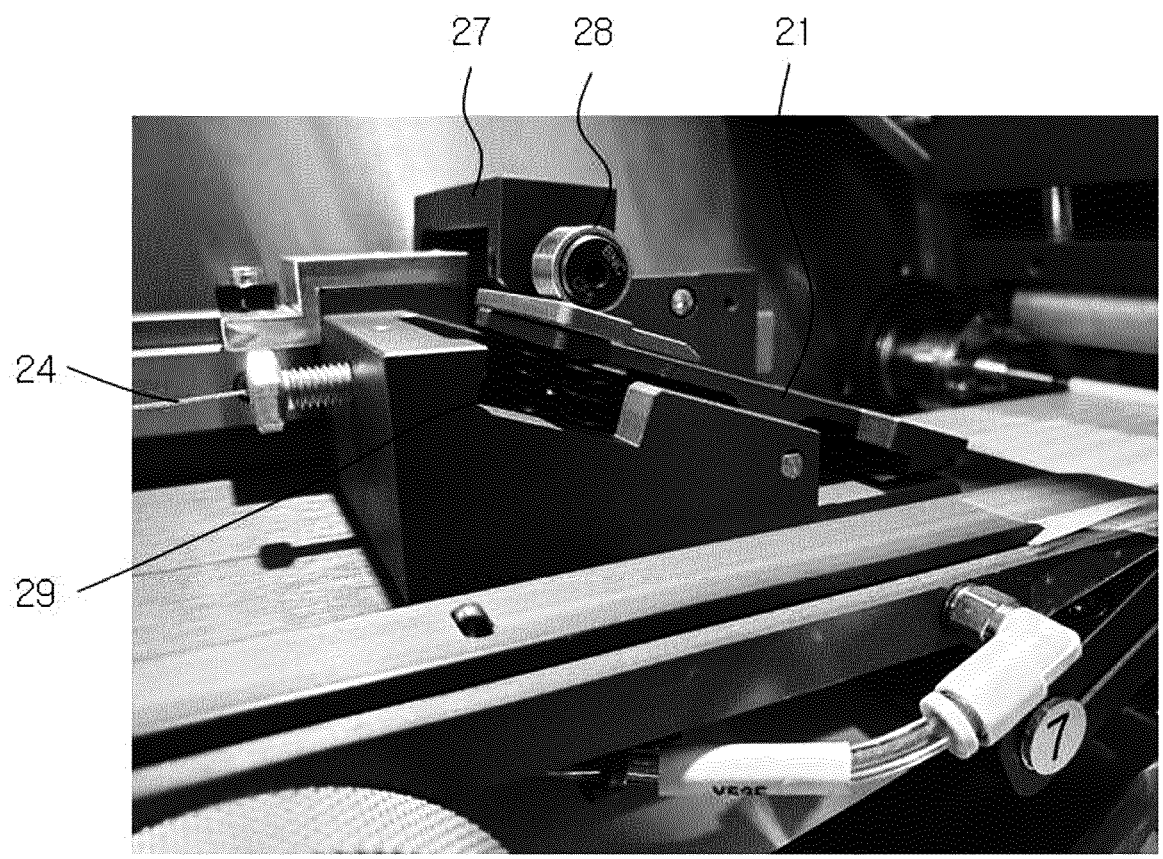
FIG. 3 is a photograph of a releaser of a gripper according to the present invention.

The electrode materials, cut to a predetermined length, are manually loaded onto the seat plate, and one end is manually positioned against the gripper that has returned to its original position. Once the winding is complete, the gripping is released by the grip releaser 28 shown in FIG. 3. The gripping part of the gripper holds the electrode material due to the force of a compression spring 29, and pressing the push part releases the grip. The grip releaser is implemented as a rotating roller mounted on a bracket 27 at a predetermined allowable height, which causes the gripping part to open when the push part is pressed beyond the allowable height.

Figure 4:
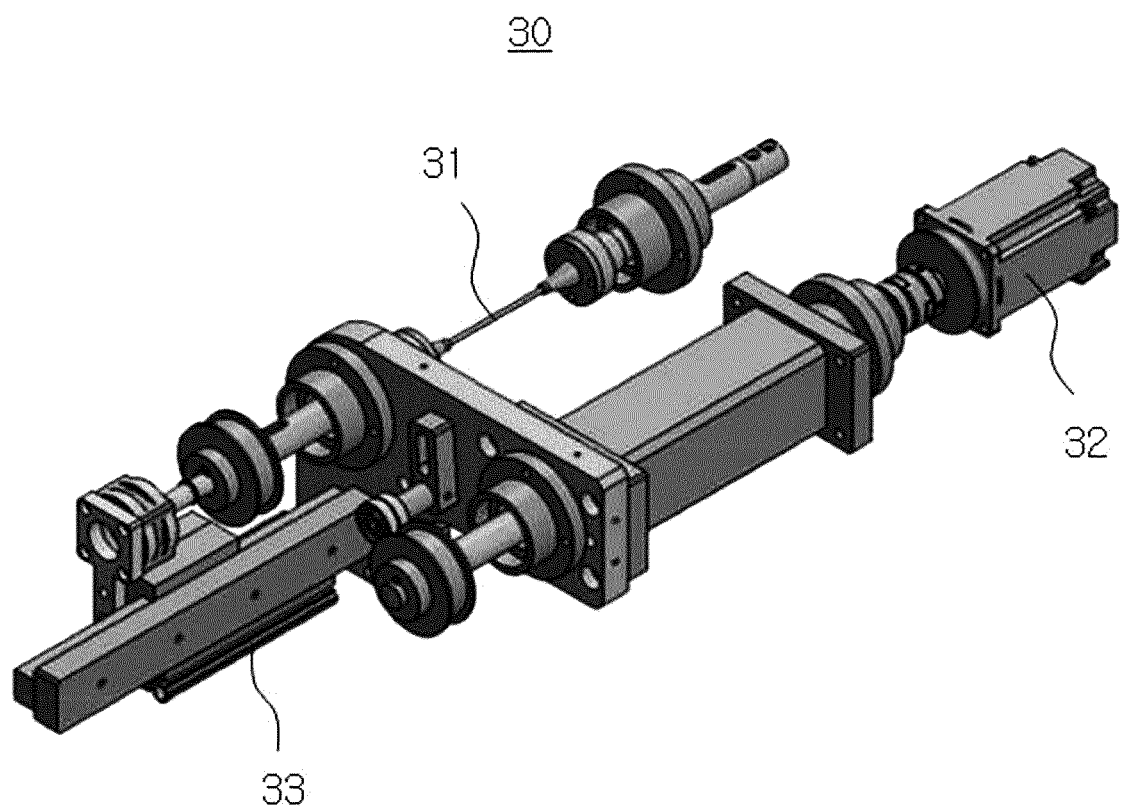
FIG. 4 is a perspective view of a winding part according to the present invention.
Figure 5:
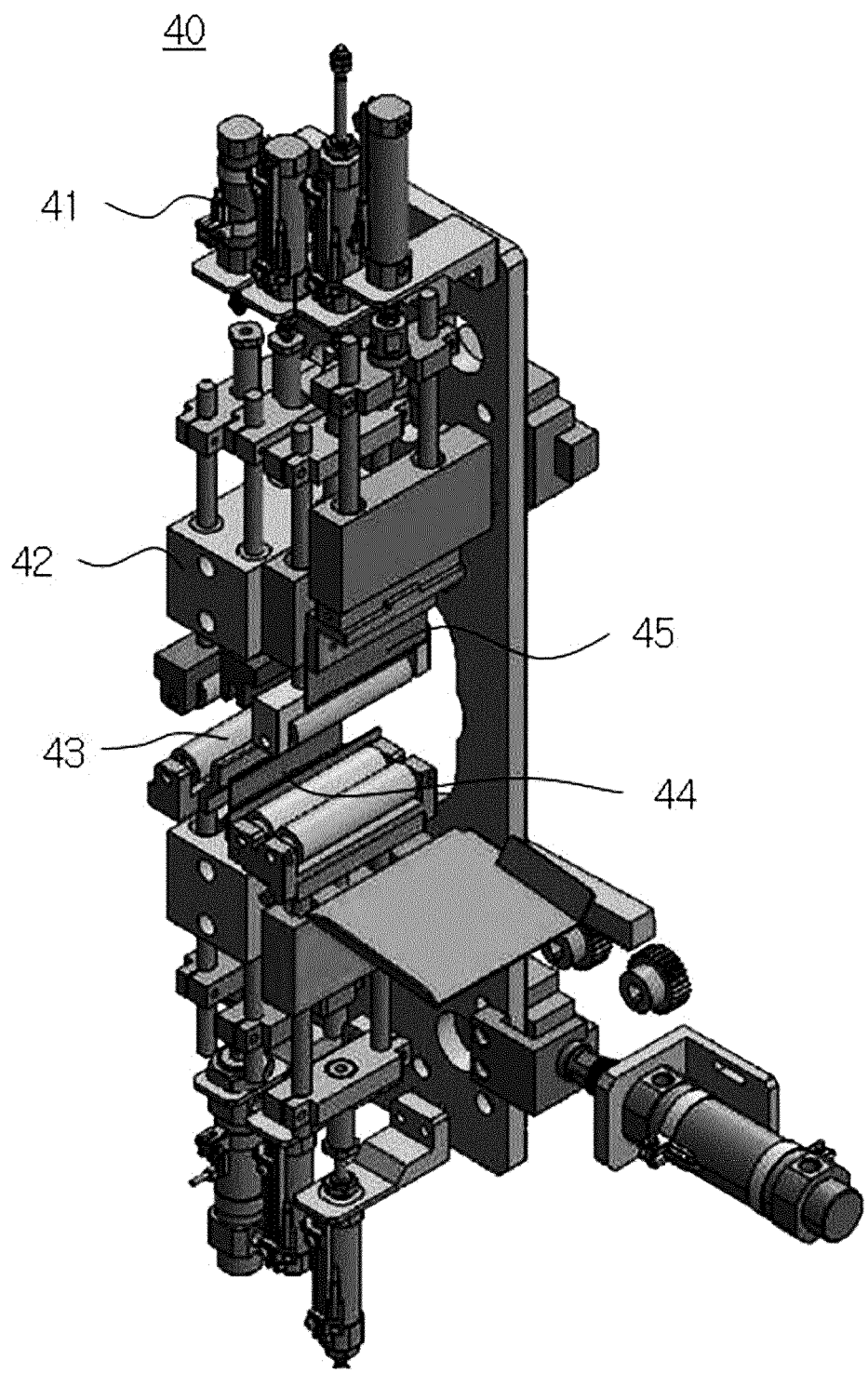
FIG. 5 is a perspective view of a cutting part according to the present invention.
Figure 6:
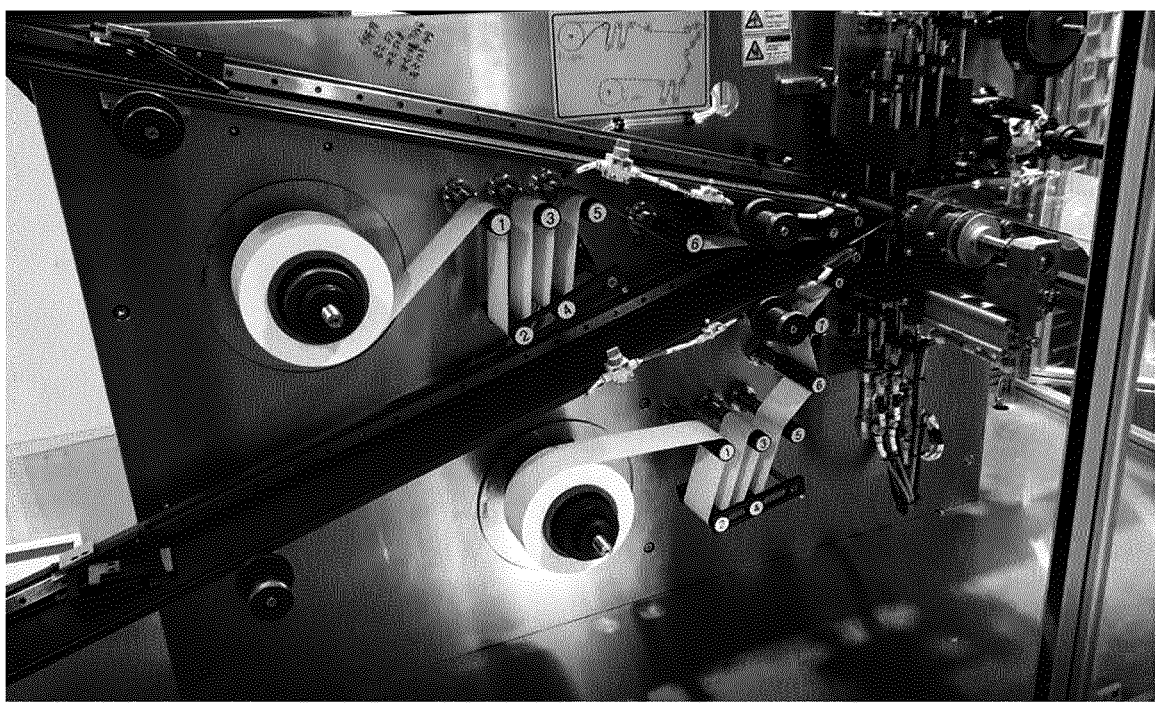
FIG. 6 is a photograph of a manufactured cylindrical battery winding apparatus according to the present invention.

FIG. 4 is a perspective view of the winding part, which includes the mandrel 31 for winding, the servo motor 32 that provides rotational force to the mandrel, and an air cylinder 33 that removes the mandrel from the wound jelly roll. The rotational force from the servo motor is transmitted to the mandrel via a belt or chain. The mandrel is cut in the center part and comes into contact with air cylinders installed on both sides, and when the jelly roll is completed, it retreats to both sides, falls out of the jelly roll, and the jelly roll is discharged.

FIG. 4 also shows a perspective view of the cutting part 40, wherein the cutting part includes a cylinder 41, a clamp holder 42, a clamp roll 43, a separator cutter 44, and a tape cutter 45.

When the jelly roll is wound to a specified circumference, the clamp holder 42 and clamp roll 43 secure the separator after the operation of the cylinder. The separator cutter 44 then operates vertically to cut the separator.

To secure the jelly roll, a fixing tape is wound around it, and the tape cutter 45 operates vertically to cut the fixing tape. Subsequently, the air cylinders on both sides retract, allowing the mandrel to be removed, thus completing and discharging the jelly roll.

INDUSTRIAL AVAILABILITY

The cylindrical battery winding apparatus according to the present invention can be used to manufacture the jelly roll utilized in cylindrical batteries.

During the production of the jelly roll, the electrode materials loading and seating guide operations can be performed semi-automatically, thereby enhancing productivity.

The invention claimed is:

1. A cylindrical battery winding apparatus, comprising:
   a pair of separator unwinding parts (10) that unwind separators from separator rolls (11) to separate a positive electrode material and a negative electrode material;
   a pair of alignment parts (20) including grippers (21) that pull and align one end of the positive electrode material and the negative electrode material respectively cut to a predetermined length;
   a winding part (30) that stacks the positive electrode material, a separator and the negative electrode material and winds the stacked the positive electrode material, the separator and the negative electrode material to form a jelly roll; and
   a cutting part (40) that cuts the separator and cuts a fixing tape to secure the jelly roll.

2. The cylindrical battery winding apparatus as claimed in claim 1, wherein the pair of separator unwinding parts is configured as a pair of upper and lower parts and a pair of tension rolls (12) used to adjust tension of the separator when the separator is unwound from the separator rolls.

3. The cylindrical battery winding apparatus as claimed in claim 1, wherein the grippers are wire-connected to a wire shaft that rotates by a servo motor.

4. The cylindrical battery winding apparatus as claimed in claim 3, wherein when the positive electrode material and a negative electrode material are wound on a mandrel, the grippers are dragged by a rotational force of the mandrel and wire of the servo motor is pulled to generate tension, and
   when winding is completed, the wire is wound around the wire shaft by rotation of the servo motor and returned to an original position.

5. The cylindrical battery winding apparatus as claimed in claim 1, wherein the grippers are guided by an LM guide.

6. The cylindrical battery winding apparatus as claimed in claim 1, wherein the grippers are released by a grip releaser.

7. The cylindrical battery winding apparatus as claimed in claim 4, wherein the winding part includes the mandrel, which is a core rod, the servo motor providing rotational force to the mandrel, and a cylinder for contacting and separating the mandrel.

8. The cylindrical battery winding apparatus as claimed in claim 1, wherein the cutting part includes a clamp roll, a clamp holder holding the clamp roll, a separator cutter for cutting the separator, a tape cutter for cutting the fixing tape, and a plurality of cylinders for vertically operating the clamp holder, the separator cutter, and the tape cutter.

* * * * *